Feb. 4, 1969
A. WALY ET AL
3,426,197
DOSIMETER FOR MEASURING NEUTRON AND GAMMA RADIATION
Filed July 16, 1965
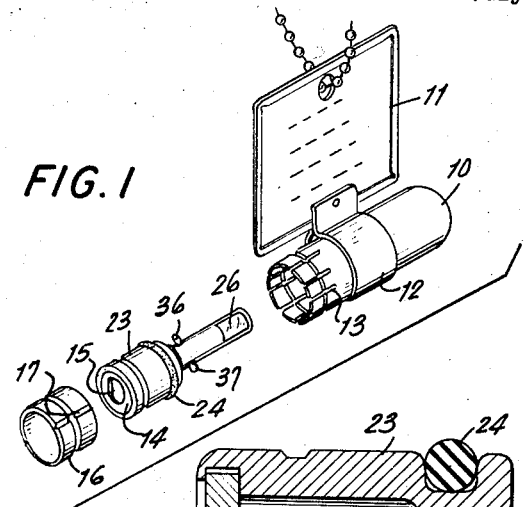
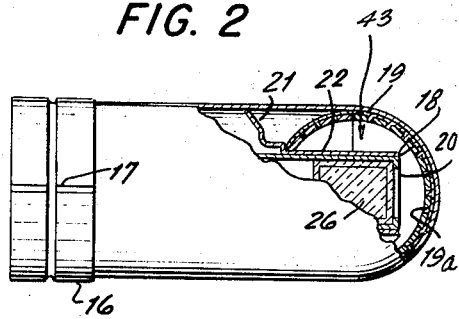
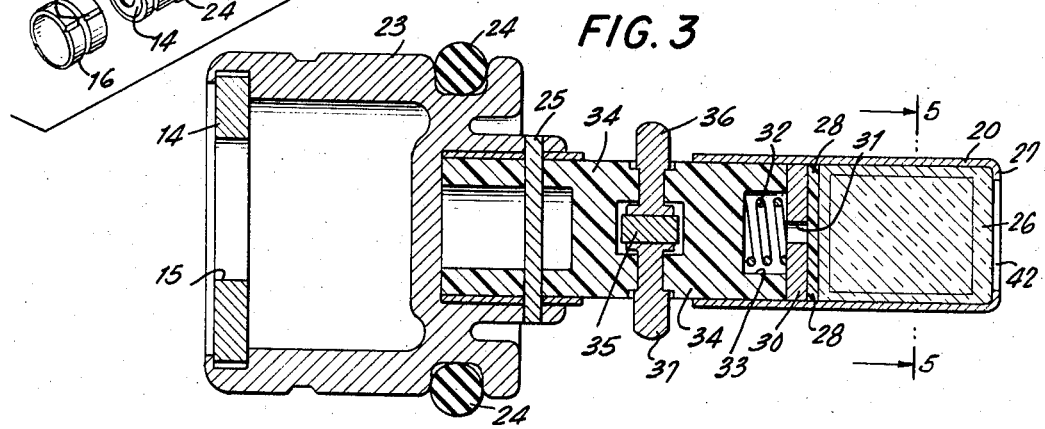
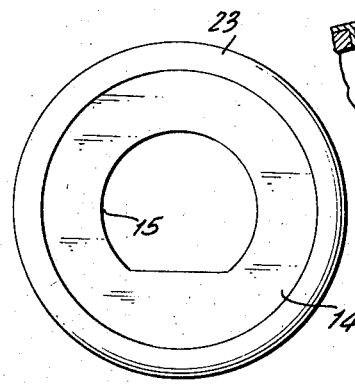
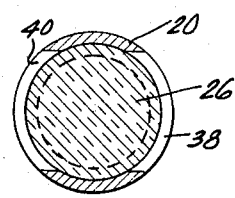
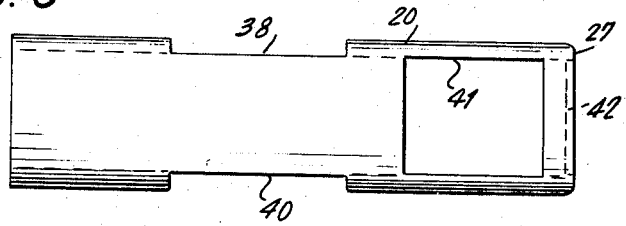
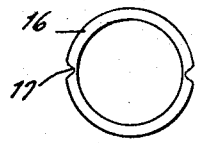
INVENTORS
ADNAN WALY
RICHARD JUST
LEONARD SCHWARTZMAN
DAVID I. ALSTER
ATTORNEY United States Patent Office 3,426,197
Patented Feb. 4, 1969

3,426,197
DOSIMETER FOR MEASURING NEUTRON AND GAMMA RADIATION
Adnan Waly, Stamford, Conn., and Richard Just, Syosset, Leonard Schwartzman, Plainview, and David I. Alster, Westbury, N.Y., assignors to Electrospace Corporation, Glen Cove, N.Y., a corporation of New York
Filed July 16, 1965, Ser. No. 472,550
U.S. Cl. 250—83                        11 Claims
Int. Cl. H01j 39/00

ABSTRACT OF THE DISCLOSURE

A dosimeter for measuring both gamma and fast neutron radiation in which a cylindrical probe having a photoluminescent glass member and a silicon diode is carried within a casing. A lead shield is provided in the casing around the photoluminescent glass for equalizing its response. Windows in the probe admit ultraviolet light and permit emission of visible luminous light. The diode is provided with outwardly extending terminals to measure the neutron radiation by the application of an electrical current.

---

This invention relates to a dosimeter for measuring the total dose received from gamma rays, X-rays and fast neutron radiation. It has particular reference to a silver activated phosphate glass and a neutron sensitive silicon diode.

Prior art dosimeters for use by personnel included photographic film badges and chargeable reed-type indicators, generally shaped like a fountain pen. The film dosimeters require development, fixing, and subsequent light transmission examination before the dosage can be evaluated. The chargeable reed dosimeters have a restricted range of dose values. Neither of these dosimeters is capable of measuring fast neutron radiation.

The present invention requires no liquid development, no preliminary charging operation, and it can be read in a few seconds in a reader which indicates radiation values on two volt meter type indicators. The dosimeter is capable of an extended range of values of at least 10,000 to 1.

One of the distinguishing features of this new dosimeter, in contra-distinction to film badge type dosimeters, chargeable type as well as some luminescent dosimeters is the fact that the dose of gamma radiation of fast neutrons can be read in a non-destructive way with the help of a reader. This means that the accumulated indication of gamma radiation and fast neutrons is not erased during the reading, but remains intact. The units can be over and over again while continuously accumulating the dosages of radiation received during all exposures.

While the present invention is quite small and can be worn as a badge-type detector, it also contains a silicon diode which has been built with materials sensitive to fast neutron radiation. When the dosimeter is placed in the reader the value of neutron dosage is indicated.

One of the objects of this invention is to provide an improved dosimeter which avoids one or more of the disadvantages and limitations of prior art arrangements.

Another object of the invention is to measure gamma radiation and fast neutron radiation in a single small instrument.

Another object of the invention is to increase the range of dosimeters.

Another object of the invention is to provide a dosimeter that is tamper-proof and cannot be opened without evidence of manipulation.

Another object of the invention is to provide a dosimeter that lends itself to automatic evaluation. This means opening the dosimeter, subsequent automatic reading and reclosing it without coming in contact with contaminating objects as for instance, the hands of an operator or with rain, humidity and other vapors.

Another object of the invention is to provide a dosimeter having substantially uniform response over a wide range of energy values.

The invention comprises a cylindrical metal probe supporting a radio photoluminescent glass enclosed in a filter shield for providing a uniform response over a wide range of energy values. The glass is enclosed in a thin well which contains apertures for activating the glass with ultraviolet light and for measuring the resulting luminescence. A silicon diode is also positioned within the probe for measuring fast neutrons. Terminals for the diode are positioned external to an inner casing so that they may be connected to a source of constant current in a reader.

The dosimeter assembly is secured to a socket containing a keyed aperture for fitting into a reader receptacle.

For a better understanding of the present invention, together with other and further objects thereof, reference is made to the following description taken in connection with the accompanying drawings.

FIGURE 1 is a somewhat exploded view of the dosimeter connected to a badge which bears the holder's name and other identification.

FIGURE 2 is a side view of the dosimeter, on an enlarged scale, with parts broken away to show the inner lead and bronze filter.

FIGURE 2A is a view of a part of the lead and bronze filter with a portion shown in section, on an enlarged scale.

FIGURE 3 is a cross sectional view, also on an enlarged scale, of the inside portion of the dosimeter.

FIGURE 4 is an end view of the dosimeter showing the keyed aperture for fitting into a reader.

FIGURE 5 is a cross sectional view of the end portion shown in FIGURE 3 and is taken along line 5—5 of that figure.

FIGURE 6 is a side view of the inner aluminum shield showing its construction.

FIGURE 7 is a plan view of one part of the lead shield formed in the shape of washer.

FIGURE 8 is an end view of a ring which may be crimped onto the end of the dosimeter to provide a tamper-detecting, closure means.

Referring now to FIGURE 1, the dosimeter includes an outer cylindrical shell 10 secured to a badge 11 by a strap 12. This view is shown without the tamper-detecting band in order to show the longitudinal slots 13 which are cut in casing 10 to make the end portion compressible. FIGURE 1 also shows a washer 14 formed with a keyed aperture 15 which insures that the dosimeter will be placed within a reader in a predetermined position. The side view shown in FIGURE 2 includes a band 16 which is placed over the end portion slots 13 and then crimped into position. The crimped portion of the band is provided with two V-shaped indentations 17 (see also FIGURE 8) which are designed to break when the band is removed. The band will thus furnish evidence of tampering with the dosimeter by someone other than an authorized technician who measures the dose. FIGURE 2 also shows a portion of the interior construction which includes a spherical lead shield 18 formed in two halves for ease in manufacture. The probe 20 is also shown in this view and is held in axial alignment with the casing 10 by a spring washer 21 containing a cylindrical portion 22.

FIGURE 2A shows the detailed structure of the lead and bronze shield 18. A bronze disc is coined to form equally spaced pins, is pressed into a lead disc and this composite shield is formed into a hemisphere. The result is a thin shell 19 of bronze on the outer surface of the filter and a plurality of cylindrical inserts 19A in the lead holes.

The purpose of the shield is to reduce the peaks of sensitivity which are inherent in the gamma sensitive glass and to make the energy response more nearly resemble the effect of the dosage on human tissues. The gamma sensitive glass used (silver activated phosphate glass) has a sensitivity peak for gamma rays of about 80 electron kilovolts. This peak is flattened by the use of the lead. However, lead shows an abrupt change in absorption coefficient at about 88 electron kilovolts where the lead atom has its K absorption edge. The partial use of bronze rectifies this sensitivity change and produces a flat characteristic, falling rapidly as the energy is reduced.

Referring now to FIGURE 3, the details of the measuring components are shown. A cylindrical socket 23 is the main supporting means for the radiation sensitive components. This socket is made of aluminum and fits into the open end portion of the shell 10 under slots 13. An O-ring 24 is positioned around the inner end of the socket for forming a water tight joint. This socket is secured to the probe 20 by means of a silver pin 25.

A cylindrical piece of radio photoluminescent glass 26 such as a silver activated phosphate glass is positioned at one end of the probe 20 for absorbing gamma rays and X-rays. The glass piece 26 fits into the end portion and abuts against a turned-over flange 27. The glass is held in place by a polyethylene spacer 28. A lead shield 30 is positioned adjoining spacer 28 and forms a continuation of the spherical shield 18. The glass 26, spacer 28, and lead washer 30 are all resiliently urged against flange 27 by a steel spring 32. The other end of the spring is in contact with the bottom of a cut-out portion 33 in a Teflon support 34.

The plastic support 34 is preferably made of Teflon but any other stable plastic may be used. This support is fabricated in two parts, the separation plane being in alignment with the axis of the neutron sensitive diode 35 and its two terminals 36 and 37. The plastic halves are retained in their supporting position by pin 25 and the probe 20. The spring 32 retains the two halves of support 34 in contact with each other.

FIGURE 6 shows the probe 20 with two cut-out portions 38 and 40 and two windows 41 and 42. Cut-out portions 38 and 40 are removed so that the diode terminals 36 and 37 can be insulated from all other metallic elements. Window 41 is for the application of ultraviolet light which is used to excite the glass after it has been exposed to gamma rays and X-rays. Window 42 at the end of the probe 20 is for the emission of luminous visible radiation which may be picked up by a photo-electric transducer and applied to an indicating meter. It is essential that these two windows be at substantially right angles to each other so that any other visible radiation which may accompany the ultraviolet light will not be reflected through window 42 to the photosensitive transducer.

The operation of this device will be apparent from the foregoing. The dosimeter is worn for a predetermined time interval and then is tested for exposure to radiation. The band 16 is first removed by breaking the band at indentations 17. The dosimeter less band is placed in the reader and opened by the reader to prevent contamination due to handling. The probe and its dosimeter components are pulled from the housing 10 as an integral unit shown in FIGURE 3. The probe 20 is next placed in a reader and aligned by the splined hole 15. While in the reader, ultraviolet light is applied through window 41 to the glass cylinder 26. The generated luminescent light is sensed through window 42 and the gamma radiation is then indicated on a suitable meter. At the same time, terminals 36 and 37 of diode 35 are connected to a measuring circuit which includes a constant current power supply of about 75 milliamperes and a voltmeter connected across the terminals. The amount of voltage indicated under these circumstances is proportional to the irradation of fast neutrons which have been applied to the diode. Reference to 43 on FIGURE 2, which is a slow neutron shield composed of lithium fluoride either sintered to form a ceramic type shell or otherwise molded with a binder as for instance polyethylene powder or equivalent. The function of the shell is to absorb slow neutrons which otherwise absorbed in the sensitive element would activate component nuclei of the glass proper whose decaying radiation of either beta or soft gamma would simulate exposure and result in a false reading. The degree of suppression should not be extended beyond that value which would indicate the dose received by an individual due to capture gamma on his body proper. Such gamma would only be registered to a minor degree in the dosimeter itself.

Having thus fully described the invention, what is claimed as new and desired to be secured by Letters Patent of the United States, is:

1. A dosimeter for measuring both gamma and fast neutron radiation comprising an outer cylindrical casing closed at one end and open at its opposite end, a socket member carried within the open end of the casing, a cylindrical probe secured at one end to the socket and extending into the casing, a radio photoluminescent glass member carried by the probe, a silicon diode carried by the probe spaced from the glass, outwardly disposed terminals on said diode extending beyond the probe, a lead shield within the casing and around the photoluminescent glass for equalizing its luminescent response to radiation of varying energy values, said probe having a first window adjacent the glass for irradiation by ultraviolet light and a second window adjacent the glass for emission of visible luminous light.

2. A dosimeter for measuring both gamma and fast neutron radiation comprising an outer aluminum cylindrical casing closed at one end and open at its opposite end, a socket member carried within the open end of the casing, a cylindrical aluminum probe secured at one end to the socket and extending into the casing, a radio photoluminescent glass member carried by the probe, a silicon diode carried by the probe spaced from the glass, outwardly disposed terminals on said diode extending beyond the probe, a lead shield within the casing and around the photoluminescent glass for equalizing its luminescent response to radiation of varying energy values, said probe having a first window adjacent the glass for irradiation by ultraviolet light and a second window adjacent the glass for emission of visible luminous light, and sealing means between the cylindrical casing and the socket member.

3. A dosimeter for measuring both gamma and fast neutron radiation comprising an outer cylindrical casing closed at one end and open at its opposite end, a socket member carried within the open end of the casing, a hollow cylindrical probe secured at one end to the socket and extending coaxially into the casing, a radio photoluminescent glass member carried by the free end of the probe, a plastic core within the probe, a silicon diode carried by the core within the probe spaced from the glass, outwardly disposed terminals on said diode extending beyond the probe, a lead shield within the casing and around the photoluminescent glass for equalizing its luminescent response to radiation of varying energy values, said probe having a first window adjacent the glass for irradiation by ultraviolet light and a second window adjacent the glass for emission of visible luminous light.

4. A dosimeter for measuring both gamma and fast neutron radiation comprising an outer aluminum cylindrical casing closed at one end and open at its opposite end, a socket member carried within the open end of the casing, a cylindrical aluminum probe secured at one end to the socket and extending into the casing, a radio photoluminescent glass member carried by the probe, a silicon diode carried by the probe spaced from the glass, outwardly disposed terminals on said diode extending beyond the probe, a perforated lead shield within the casing and around the photoluminescent glass for equalizing its luminescent response to radiation of varying energy values, said probe having a first window adjacent the glass for irradiation by ultraviolet light and a second window adjacent the glass for emission of visible luminous light.

5. A dosimeter for measuring both gamma and fast neutron radiation comprising an outer aluminum cylindrical casing closed at one end and open at its opposite end, a socket member carried within the open end of the casing, a hollow cylindrical aluminum probe secured at one end to the socket and extending coaxially into the casing, a spring washer comprising outwardly extending spring elements and a cylindrical portion to receive the probe to maintain its coaxial position, a radio photoluminescent glass member carried by the free end of the probe, a plastic core within the probe, a silicon diode carried by the core within the probe spaced from the glass, outwardly disposed terminals on said diode extending beyond the probe, a perforated lead shield within the casing and around the photoluminescent glass for equalizing its luminescent response to radiation of varying energy values, said probe having a first window adjacent the glass for irradiation by ultraviolet light and a second window adjacent the glass for emission of visible luminous light.

6. A dosimeter according to claim 2 in which the outer casing is secured to the socket by a frangible band.

7. A dosimeter according to claim 4 in which the shield perforations are filled with a copper metal.

8. A dosimeter according to claim 4 in which the shield perforations are filled with a copper metal, the shield is substantially spherical and the perforations are equally spaced and radial.

9. A dosimeter according to claim 1 in which the first window is located in the side of the probe and the second window in the front of the probe.

10. A dosimeter according to claim 4 in which the shield is covered with a layer of copper metal, the perforations are filled with a copper metal, and the shield is substantially spherical and the perforations are equally spaced and radial.

11. A dosimeter according to claim 10 in which the metal is bronze.

References Cited

UNITED STATES PATENTS 3,063,010  11/1962  Richardson.
3,198,945  8/1965   Dewes et al.
3,255,351  6/1966   Walsh et al. _____ 250—83

ARCHIE R. BORCHELT, *Primary Examiner.*

U.S. Cl. X.R.

250—83.1